Figure 1:
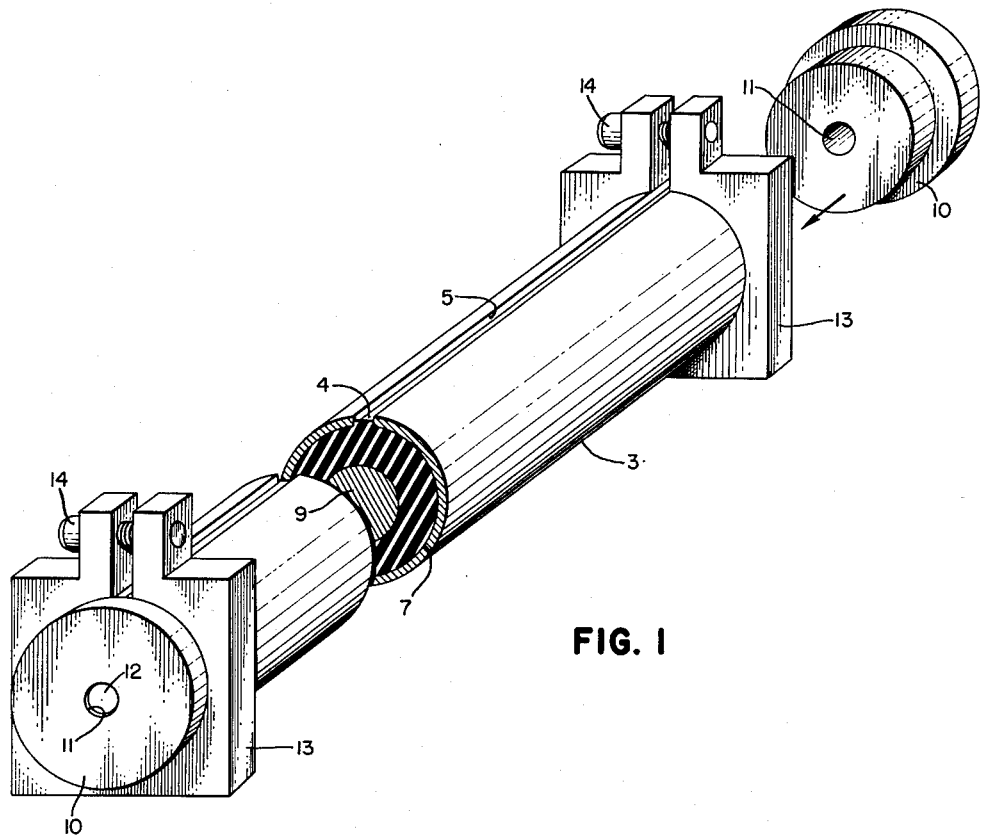

May 19, 1964   A. F. FINELLI   3,133,340
PRINTER'S ROLL COMPRISING A POLYURETHANE AND
METHOD FOR PRODUCING SAME
Filed Nov. 10, 1959

*INVENTOR.*
ANTHONY F. FINELLI
BY
*J. B. Holden*
ATTORNEY though! F. Finelli, Akron, Ohio, assignor to The Goodyear Tire & Rubber Company, Akron, Ohio, a corporation of Ohio
Filed Nov. 10, 1959, Ser. No. 852,134
3 Claims. (Cl. 29—129.5)

3,133,340
PRINTER'S ROLL COMPRISING A POLYURETHANE AND METHOD FOR PRODUCING SAME

Anthony F. Finelli, Akron, Ohio, assignor to The Goodyear Tire & Rubber Company, Akron, Ohio, a corporation of Ohio
Filed Nov. 10, 1959, Ser. No. 852,134
3 Claims. (Cl. 29—129.5)

This invention relates to novel polyurethane compositions, methods for the preparation thereof and to articles made therefrom. More particularly, this invention relates to elastomeric polyurethane compositions having a Shore A hardness of from 10 to 30, excellent bounce or recovery characteristics and precision shaping properties; to methods for their preparation; and to improved printer's inking rolls made from the polyurethane compositions.

Within the last year, several publications have extolled the merits of polyurethane elastomers for the preparation of printer's inking rolls. For example British Patent 803,160 (which is the most detailed of these publications) describes the use of polyesterurethane compositions for printer's inking rolls. The particular polyesterurethane compositions described in this patent consist of the reaction products of a polyisocyanate with a polyester, the polyester being the reaction product of a glycol or polyglycol with a carboxylic acid. However, the polyester compositions of this British patent have relatively high Shore A hardness, namely: in excess of 50 Shore A hardness. The high Shore A hardness of the usual polyesterurethanes does not permit their satisfactory use for letter press and lithographic printer's rolls since materials satisfactory for this purpose must have a Shore A hardness of about 10 to 30 and must exhibit the further properties of good bounce or resilience, ink distribution and transfer, etc.

In regard to the prior art, it is known also that a very high molar ratio of diisocyanate to polyester yields a polyesterurethane having a high Shore A hardness and furthermore these high molar ratio diisocyanate to polyester reaction products also have low bounce or recovery properties. Although it is possible to make polyesterurethanes which have the low Shore A hardness required for letter press and lithographic printer's rolls by using a low molar ratio of diisocyanate to polyester, the resulting polyesterurethane has little or no recovery and does not respond readily to grinding and buffing to produce precision rolls having the flawless surface characteristics required by letter press and lithographic printer's rolls. For example, these low molar ratio diisocyanate to polyester reaction products smear or tear when subjected to machining or buffing to produce the close dimensional tolerances required for this type printer's inking rolls.

In addition to the above objectionable properties of the high molar ratio diisocyanate to polyester polyurethanes for printer's inking rolls, these high molar ratio diisocyanate to polyester products have an economic disadvantage in that more of the higher priced diisocyanate is required for each mol of polyester used; this further aggravates the cost disadvantage of the polyurethane roll relative to the standard "composition" roll, i.e. the glueglycerine roll.

Figure 2:
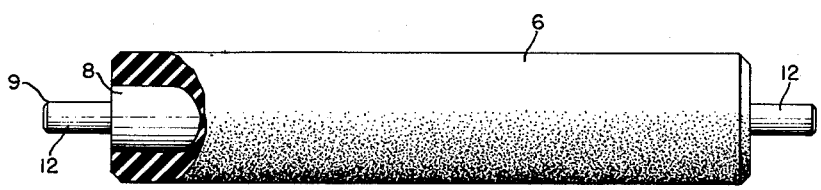

A principal object of this invention is to provide a polyurethane composition having excellent printer's inking roll properties, because it has greater toughness than the composition roll and has the hardness, bounce, machining and ink-transfer properties associated with the prior art composition rolls; and, in addition to these properties, it has the further advantage of a lower cost when compared with the prior art-described polyurethane compositions useful for printer's inking rolls. Another object of this invention is to provide a low molar ratio of diisocyanate to polyester polyurethane elastomer which is suitable for printer's inking rolls because it has the required low Shore A hardness (low compression set), as well as excellent bounce and machining properties. Still other objects and advantages of this invention will become apparent from the following specification, reference being had to the accompanying drawings which illustrate: a mold for casting a printer's inking roll or related article and the finished article, wherein FIG. 1 of the drawings is a perspective view in partial section of the mold showing one end plate in an expanded view for clarity. FIG. 2 is a side elevational view of the finished roll in partial section.

The objects of this invention are accomplished by reacting about 0.6 to about 1 mol of diisocyanate with each mol of a hydroxyl-terminated mixed polyester having a molecular weight of about 1500 to 5000, casting the fluid polyesterurethane to form a printer's inking roll, curing said polyesterurethane and then machining the cured product to obtain a precision finish on the surface of said roll, said polyester comprising the reaction product of a dicarboxylic acid with a mixture of polyols, said polyols comprising at least about 95% by weight of low molecular weight glycols or polyglycols and 1 to about 5% by weight of a hydroxylated monomer having 3 or 4 hydroxyls per molecule.

The hydroxyl-terminated mixed polyesters of this invention are made by esterifying 1 mol of a low molecular weight dibasic acid with an excess of a mixture of polyols. As indicated above, this mixture of polyols comprises at least 95% by weight of a low molecular weight glycol or polyglycol and from about 1 to 5% by weight of a hydroxylated monomer containing 3 to 4 hydroxyl groups per molecule. These mixed polyesters should have a hydroxyl number of 40 to 70, and preferably 50 to 60, and an acid number less than about 5 and preferably less than 3. Generally, the low molecular weight aliphatic dibasic acids or dicarboxylic acids used in this invention may have from 6 to 10 carbon atoms with the preferred dibasic acids being adipic and isosebacic.

The low molecular weight glycols or ether glycols useful in this invention are limited to ethylene glycol, propylene glycol and diethylene glycol because the polyurethanes derived from the tetramethylene glycols do not not give a polyesterurethane satisfactory for the manufacture of printer's inking rolls. Thus, those glycols containing at least one tetramethylene group are not included within the scope of this invention. In fact, the low molecular weight glycols or ether glycols of this invention have less than 4 consecutive polymethylene groups and a molecular weight less than about 100.

On the other hand the hydroxyl-terminated monomers may have more than 4 consecutive methylene groups as exemplified by 1,2,6-hexanetriol, but they may have fewer methylene groups too, as for example it may have 2, 3 and 4 consecutive methylene groups. In general, these monomers have a molecular weight less than 200 as exemplified by trimethylol propane, trimethylol ethane, glycerol and pentaerythritol.

The polyisocyanates of this invention are limited to tolylene diisocyanate and its isomeric mixtures, tolidine diisocyanate, and methylene bis-(4-phenyl isocyanate).

It is desirable to prepare the polyurethane elastomers of this invention according to certain critical manipulative steps in order to obtain the best results. For example, it is preferred that the polyester be subjected to a pressure of 15 to 30 millimeters of mercury and a temperature of 90° to 120° C. for 1 to 2 hours to remove the last traces of water. The water removal step is followed by the addition of the desired amount of diisocyanate to the dehydrated polyester. The temperature of the polyester should be at least about 80 to 90° C. when the diisocyanate is added. After the addition and incorporation of the diisocyanate, it is also preferred to continue the reaction with agitation under a vacuum for several minutes. The the vacuum is broken. Stirring is continued for about 7 minutes at which time the fluid product is poured into the printer's inking roll mold containing a spindle centered therein. Precautions should be taken to prevent incorporating air into the melt as it is poured. This is best accomplished by reducing the height above the mold from which the molten polyurethane is poured by using a mold having an elongated sprue such as the one of FIG. 1. The cast roll is then cured by heating at 80° to 83° C. for about 16 hours. The use of higher curing temperatures than 80° to 83° C. frequently results in the cured roll containing appreciable fissures and holes. The cured roll is then removed from the mold and buffed or machined to the desired surface finish.

To specifically illustrate a preferred embodiment of this invention, a polyurethane elastomer was prepared by reacting 0.85 mol of tolylene diisocyanate with 1 mol of a mixed adipate ester of a mixed polyol consisting of 95% by weight of ethylene glycol and 5% by weight of trimethylol propane. The diisocyanate and glycol were reacted at 80 to 90° C. Prior to the gelling of solidification of the polyesterurethane, the reaction product was poured into a mold such as mold 3 of FIG. 1. The mold was filled with sufficient polyurethane reaction product to give a lip or flash 4 which extended up into the sprue 5 of the mold. The mold was then placed in a curing oven for 16 hours at 80 to 83° C. to cure the cast roll. The cured roll was removed from the mold and the flash or excess polyurethane on the cured roll was removed, preferably with a rubber knife. After removal of the flash, the roll was ground and buffed to give the finished roll 6 of FIG. 2, which may have a finished surface tolerance of ±.002 to .003 inch relative to the overall diameter of the finished roll 6.

It has been found expedient to coat the inside 7 of the mold with a mold releasing agent such as Carnauba wax or the silicone greases prior to filling the mold with polyurethane elastomer. Also, it has been found excellent to sand blast the body 8 of the printer's roll spindle 9 and then coat the body of the spindle with an adhesive such as the one described in U.S. Patent 2,850,424 to enhance the adhesion between the polyurethane elastomer and the metal body of the spindle. Referring to FIG. 1, it will be noticed that the spindle 9 has been placed within mold 3 and centered therein by means of end plates 10 which have holes 11 for receiving the journal member 12 of the spindle. Incidentally, one of said plates is shown in FIG. 1 in an expanded view for the sake of clarity. After the spindle is placed within the mold and centered therein by the end plates, clamps 13 are positioned on the mold and screws 14 are tightened to lock the end plates in position before pouring the liquid polyurethane into the mold.

A series of polyurethane elastomers were prepared by reacting various ratios of a mixed polyester with commercial tolylene diisocyanate (80% 2,4-tolylene diisocyanate and 20% 2,6-tolylene diisocyanate) at 80 to 90° C. These polyurethane elastomers were cured for 16 hours at 80 to 83° C. Test samples were taken from each run of the polyurethane elastomers prepared and used to determine the physical properties of the resulting elastomer.

Table 1 shows the effect of the variation of the molar ratio of diisocyanate to polyester on the physical properties of the polyurethane when the polyester used is the adipate ester of a mixed polyol consisting of 95% ethylene glycol and 5% trimethylolpropane.

Table 1

| Run | Molar Ratio, Diisocyanate to Polyester | Shore-A Hardness | Tensile, Pounds per Square Inch | Elongation, percent | Tinius Olsen Flow |
|---|---|---|---|---|---|
| 1 | 0.90 | 26 | 195 | 390 | 544 |
| 2 | 0.85 | 22 |  |  | 544 |
| 3 | 0.80 | 18 | 710 | 540 | 667 |
| 4 | 0.75 | 10 | 743 | 635 |  |

Tinius Olsen flow values were determined using the Tinius Olsen flow machine at a 2-minute time interval, a pressure of 500 pounds per square inch and a temperature of 212° F. and the resulting values are expressed as the time in seconds required to yield one inch of flow. From the data in Table 1 it is apparent that molar ratios of diisocyanate to polyester between 0.75 and 0.90 produced elastomer having Shore A hardness of between 10 and 26 and Olsen flow values between 500 and 700 seconds. It should be noted that Shore A hardness and Olsen flow values of this magnitude are within the range required for printer's roll. Hence, very satisfactory physical properties for polyurethane printer's inking rolls are obtained at about 0.80 to 0.85 molar ratio of diisocyanate to polyester. These polyurethane elastomers, in addition to having satisfactory Shore A hardness and Olsen flow values, will not become flat if subjected to pressure as by a pencil point or another roll but will immediately recover from the depression made by the pencil point or roll upon removal of the pressure. Lithographic and letter press rolls made from the elastomers shown in Table 1 were still giving very satisfactory service after six months of continuous use under conditions where the control Ducter roll of conventional materials showed considerable increase in hardness and severe pitting.

On the other hand, when it was attempted to make a polyurethane printer's inking roll from a 0.85 molar ratio of diisocyanate to polyesterurethane using a polyester consisting of the reaction produce of only ethylene glycol and isosebacic acid, it was found that this polyurethane had a low Shore A hardness and low Olsen flow values but the recovery from the pencil point pressure test was very poor. In fact, it was found that it took a diisocyanate to polyester molar ratio of about 1.5 with the isosebacic acid to produce a polyurethane having a Shore A hardness of around 30, but this polyesterurethane still had very poor bounce and was very yielding when subjected to the pressure of a pencil point and recovered very slowly upon release of the pressure. On the other hand, 100% ethylene glycol adipate ester yielded a polyurethane with these diisocyanate-to-polyester molar ratios which was very boardy. Therefore, the polyesterurethanes made from a polyester free of triol and higher polyols do not have physical properties as well suited to the manufacture of printer's inking rolls of low Shore A as the mixed diol/triol polyesterurethanes of this invention.

While certain representative embodiments and details have been shown for the purpose of illustrating the invention, it will be apparent to those skilled in this art that various changes and modifications may be made therein without departing from the spirit or scope of the invention.

What is claimed is:

1. A method of producing a printer's ink roll comprising
    (1) centering a spindle within a printer's ink roll mold;
    (2) filling the mold with a fluid polyester urethane, said fluid polyester urethane comprising a reaction mixture comprising .6 to 1 mol of a diisocyanate selected from the class consisting of tolylene diisocyanate, tolidine diisocyanate and methylene bis (4-phenyl isocyanate) with 1 mol of a polyester having a molecular weight of about 1500 to 5000, an acid no less than 5 and a hydroxyl number of 40–70, said polyester comprising the reaction product of a dicarboxylic acid having from 4 to 10 carbon atoms with a mixture of polyols comprising at least 95% by weight of a glycol selected from the class consisting of ethylene glycol, diethylene glycol and propylene glycol and 1 to 5% by weight of a hydroxylated monomer selected from the class consisting of trimethylol ethane, trimethylol propane glycerol, pentaerythritol, and 1,2,6-hexane triol;

(3) curing the fluid polyurethane to obtain a cured product having a Shore A hardness of at least 10 and no more than about 30, and (4) machining the cured product to obtain a precision finish on the surface of the roll.

2. An improved printer's inking roll comprising a spindle having its core covered with a rigid elastomeric polyesterurethane having a Shore A hardness of at least about 10 and no more than about 30 and an Olsen flow of about 500 to about 700, said polyesterurethane consisting of the reaction product of about 0.6 to about 1 mol of diisocyanate with each mol of a hydroxyl-terminated mixed polyester having a molecular weight of about 1500 to 5000, an acid number of less than 5 and a hydroxyl number of 40 to 70, said hydroxyl-terminated polyester comprising the reaction product of a dicarboxylic acid having from 6 to about 10 carbon atoms with a mixture of polyols comprising at least 95% by weight of a low molecular weight glycol selected from the group consisting of ethylene glycol, diethylene glycol and propylene glycol and 1 to 5% by weight of a hydroxylated monomer selected from the class consisting of trimethylol ethane, trimethylol propane, glycerol, pentaerythritol and 1,2,6-hexane triol, said diisocyanate being selected from the class consisting of tolylene diisocyanate, tolidine diisocyanate and methylene bis (4-phenyl isocyanate).

3. The inking roll of claim 2 wherein the outside diameter of the polyurethane coating has a tolerance of ±0.002 to ±0.003 of an inch.

References Cited in the file of this patent

UNITED STATES PATENTS

| | | |
|---|---|---|
| Re. 24,514 | Hoppe et al. | Aug. 12, 1958 |
| 2,650,212 | Windemuth | Aug. 25, 1953 |
| 2,778,810 | Muller et al. | Jan. 22, 1957 |
| 2,916,403 | Calderwood | Dec. 8, 1959 |
| 2,935,487 | Fox et al. | May 3, 1960 |
| 3,025,160 | Bunge et al. | Mar. 13, 1962 |

FOREIGN PATENTS

| | | |
|---|---|---|
| 749,541 | Great Britain | May 30, 1956 |
| 802,511 | Great Britain | Oct. 8, 1958 |
| 803,160 | Great Britain | Oct. 22, 1958 |

OTHER REFERENCES

Germany, D 6004–39c,6, Mar. 10, 1955.